Jan. 15, 1952 F. A. HESTER 2,582,831

LOGARITHMIC CIRCUIT

Filed March 22, 1946 2 SHEETS—SHEET 1

INVENTOR.
FRANK HESTER
BY Alfred W. Barber
ATTORNEY

LOGARITHMIC CIRCUIT

Filed March 22, 1946 2 SHEETS—SHEET 2

INVENTOR.
FRANK HESTER
BY Alfred W. Barber
ATTORNEY

Patented Jan. 15, 1952

2,582,831

UNITED STATES PATENT OFFICE 2,582,831

LOGARITHMIC CIRCUIT

Frank A. Hester, New York, N. Y., assignor to Faximile, Inc., New York, N. Y., a corporation of Delaware Application March 22, 1946, Serial No. 656,216

11 Claims. (Cl. 250—207)

The present invention relates to facsimile signal pick-up devices and in particular to a method of and means for providing linear signal variations proportional to the density of the subject being scanned.

One object of the present invention is to provide a method of and means for generating a signal which is a linear function of the density of the subject being scanned in a facsimile or similar system.

Another object is to provide a device in which the output signal is proportional to the logarithm of the input signal.

These and other objects of the present invention will be evident from the detailed description given in connection with the drawing.

In the drawing

In the art of facsimile subject matter consisting of pictures, written or printed text, etc., is scanned by a beam of light concentrated into a small spot. The reflected light varying in accordance with the density of the subject at any particular point is directed into a photo-electric cell. The varying currents generated by the photo-electric cell representing these variations in density are amplified and transmitted by wire or radio to a receiving point. At the receiving point the received signals are again amplified and utilized to record on a sensitized surface. This received record should be a faithful copy of the subject matter on the original transmitted copy. One of the best methods for recording the received signal is electrolytically. In one form of electrolytic recording device an iron-bearing electrode forms a color lake on a record sheet. In this type of recording the density of the mark produced on the record sheet is substantially proportional to the current amplitude of the recording signal. Since, however, the photo-electric cell current in the usual circuit is an exponential function of the density of the original subject copy an exponential relation exists between the density of the original copy and the density of the recorded copy. The present invention is concerned with a method of and means for introducing a logarithmic element into the system so that the exponential relation between the subject density and recorded density is transformed into a linear relation. In a preferred form of the present invention a multiplier type photo-electric cell is connected so that it generates an output voltage linearly related to the density of the subject copy over at least a predetermined range.

Figure 1:
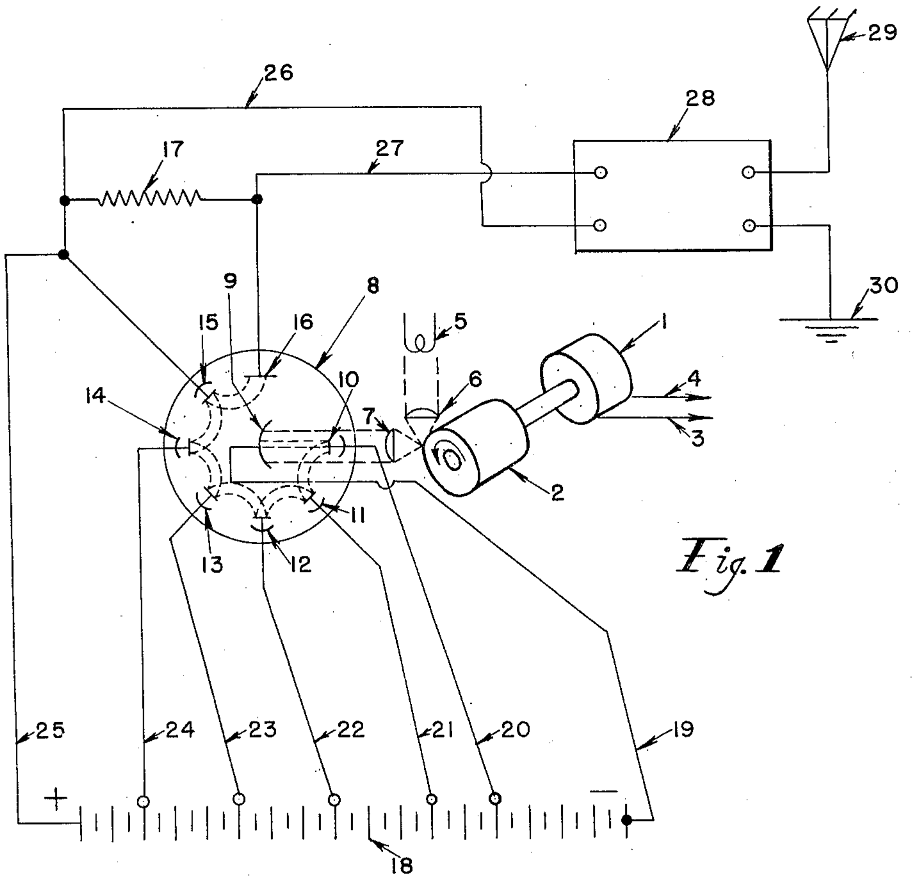
Figure 1 shows one embodiment of the present invention.

Figure 1 shows a preferred embodiment of the present invention in which a photo-electric cell generates an output voltage proportional to the density of the subject copy. Figure 1 shows a motor 1 connected to a source of power by means of wires 3 and 4 and driving a copy drum 2 on the surface of which is secured a subject copy to be scanned. A light source 5, focussed to a small spot of light by means of lens system 6, scans the copy on drum 2 and the reflected light directed by lens 7 to the cathode 9 of the photoelectric cell 8 releases electrons from cathode 9 the number of which is proportional to the amount of the received light. This light and hence the number of electrons emitted is an exponential function of the density of the element of the copy which is under the scanning spot of light at any given instance whereas a linear relationship is desired. Photo-electric cell 8, which is not limited to this particular form, is shown as the multiplier type of photo-electric cell in which secondary emission multiplying or deflecting anodes or dynodes 10, 11, 12, 13, 14 and 15 are connected by means of wires 20, 21, 22, 23, 24 and 25 to successively higher potential points on battery 18. The electrons emitted from cathode 9 strike the first anode 10 liberating secondary electrons which in turn are directed to anode 11. These in turn generate more secondary electrons from anode 11 and so on to anode 15. Final or collector anode 16 is connected through load resistor 17 to anode 15. The electrons leaving anode 15 will have velocities in accordance with a Maxwellian distribution, i. e., a distribution such that the number of electrons at a given velocity is proportional to the reciprocal of the exponential of the square of the velocity. A portion of these electrons will have sufficient velocity to reach the final anode 16 in the absence of an accelerating potential. The current due to these electrons passes through resistor 17 to return to anode 15 and thus a voltage drop is produced across resistor 17. The polarity of this voltage is such that a retarding electrostatic field is set up between anode 15 and anode 16, i. e., anode 16 becomes negative with respect to anode 15 by the amount of the voltage drop in resistor 17. It has been found that the overall effect of the velocity distribution and the retarding field produced by the current in resistor 17 provides a logarithmic relation between the number of electrons emitted from anode 15 and the voltage generated in resistor 17 over a wide range. Since the number of electrons emitted from anode 15 is proportional to amount of light striking cathode 9 the voltage generated across resistor 17 will bear a logarithmic relation to the quantity of light and, hence, a linear relation to the density of the subject copy. The value of resistor 17 affects the range over which the logarithmic relation is produced and it has been found with one particular type of multiplier photo-electric cell that a value of 10 megohms produces the logarithmic relation over a wide range. The output voltage generated across resistor 17 may be utilized in any conventional manner as, for instance, by applying it to a facsimile radio transmission system 28 over wires 26 and 27 and radiating by means of connected antenna 29 and ground 30.

Figure 2:
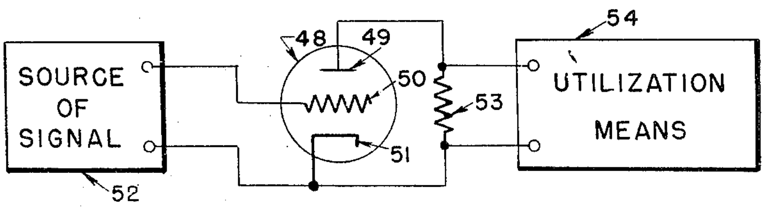
Figure 2 shows a modified form of the present invention.

Figure 2 shows a further modification of the embodiment of the present invention. Figure 2 shows a thermionic vacuum tube 48 having an anode 49, a control grid electrode 50 and a cathode electrode 51. Cathode 51 may be heated by conventional means not shown. A source of signal 52 is to be reproduced logarithmically, is connected between cathode 51 and control grid electrode 50. An output load resistor 53 is connected directly between plate 49 and cathode 51 and a utilization means 54 is connected across at least a portion of load resistor 53. Electrons emitted from cathode 51 pass through control grid 50 in an amount proportional to the instantaneous value of the signal from source 52 but at velocities varying as described in connection with Figure 1. The electrons reaching plate 49 bear a logarithmic relation to the number of electrons passing through grid 50 due to the fact that there is no bias potential applied to plate 49 except the current determined retarding field voltage across resistor 53. Therefore the current flowing in load resistor 53 and the voltage applied to the input of utilization means 54 bears a logarithmic relation to the signal voltage from source 52.

Figure 3:
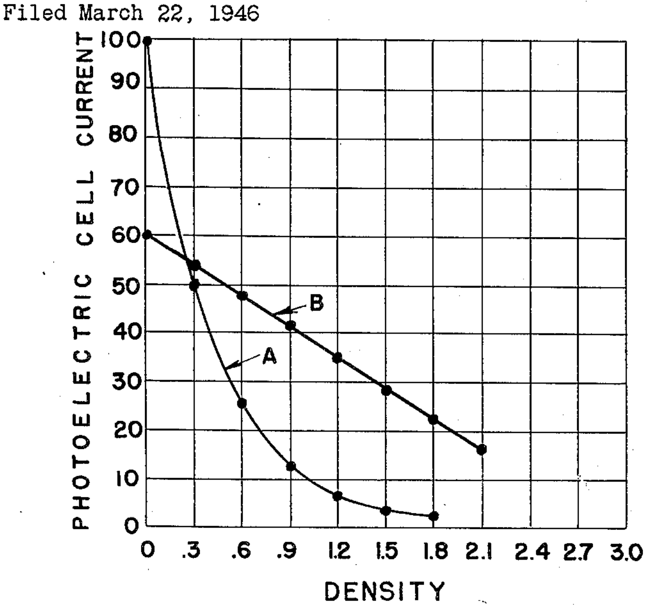
Figure 3 shows a graph illustrating the operation of Figure 1.

Figure 3 shows a graph illustrating the operation on Figure 1. Curve "A" shows the photo-electric cell current of a conventional circuit plotted against density of the subject copy in a system in which there is a linear translation of light into photo-electric cell current. It will be noted that this curve has an exponential form due to the fact that the actual light flux is an exponential function of the density. As has been pointed out before it is desirable in a facsimile system to provide photo-electric cell current variations which are a linear function of density. Curve "B" is a plot of photo-electric cell output current against density for a device as shown in Figure 1. It will be seen that this curve is essentially a straight line. When these photo-electric cell currents are amplified, transmitted and received at a receiving point and are then transformed into varying densities on a recording sheet, it will be found that the density of the record is a linear function of the density of the original copy. When this is true a marked improvement in the tone values of the received copy will be found. Without good tone scale reproduction black-and-white copy may be reproduced but half-tone copy suffers badly. Thus, with the present system reproduction on copy having a wide scale of tone value may be reproduced faithfully.

Figure 4:
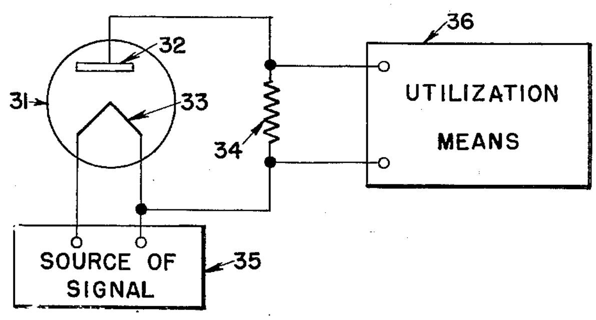
Figure 4 shows another embodiment of the present invention.

Figure 4 shows another embodiment of the present invention. Figure 4 shows a thermionic diode vacuum tube 31 having a plate 32 and a filament 33. A source of signals 35 is connected across filament 33 supplying it with heating current. An output load resistor 34 is connected between plate 32 and filament 33 and a utilization means 36 is connected across resistor 34. As the amplitude of signals from source 35 is increased beyond the point at which electron emission is produced from filament 33 the value of quantity of emitted electrons will increase according to a steeply rising characteristic and will cover a wide range of values. However, with the connections shown in Figure 4 the number of electrons reaching plate 32 will be determined by their velocity distribution, as set forth in connection with Figures 1 and 2, and by the retarding field, due to the opposing voltage generated across resistor 34. These effects are in opposition to the steeply rising emission effect giving a more nearly linear or much less steeply rising output voltage with respect to the signal from source 35.

Figure 5:
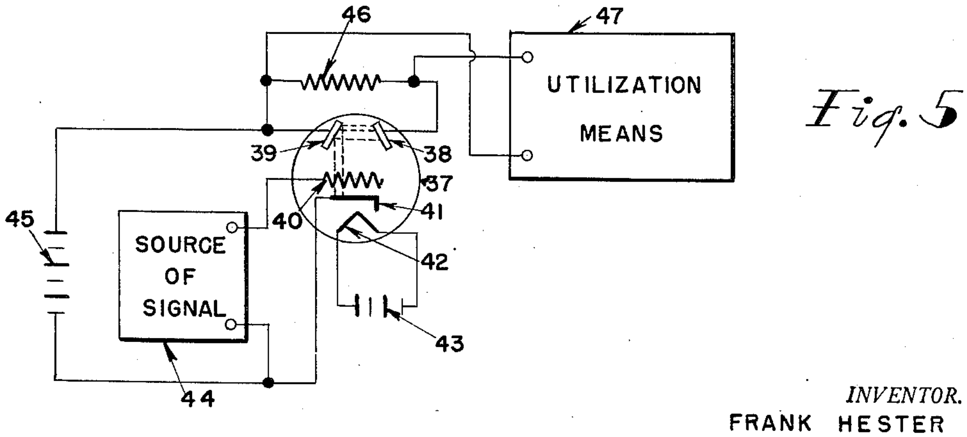
Figure 5 shows still another embodiment of the present invention.

Figure 5 shows still another embodiment for carrying out the objects of the present invention. Figure 5 shows a thermionic device 37 including an electron emitting cathode 41, heated by a heater 42, which in turn is energized by a battery 43, a control electrode 40, a first plate or anode 39 capable of emitting secondary electrons, and a second plate or anode 38. A plate battery 45 is connected between cathode 41 and plate 39 and a load resistor 46 is connected between plates 39 and 38. The electrons reaching plate 39 will be under the linear control of control electrode 40 which is connected to the source of signals 44. Thus the plate current in first anode 39 is a linear function of the signals from source 44. Secondary electrons will be emitted from first anode 39 having a velocity distribution as described in connection with anode 15 of Figure 1. However, since there is no bias voltage between the first anode 39 and second anode 38 except the retarding field voltage generated across resistor 46 there will be a logarithmic distribution of electron current reaching second anode 38. Thus the current flowing in load resistor 46 will bear a logarithmic relation to the voltage from signal source 44. The logarithmic voltage thus generated across load resistor 46 is applied to utilization means 47. Here again the output voltage applied to utilization means 47 will bear a logarithmic relation to the signals from source 44.

The various embodiments of the invention have an unenergized electron collector element in a tube, and have an electron space stream generator means in the tube receptive to an input stimulus and including an element from which the electrons are directed toward the collector element in quantities proportional to the input stimulus. The electron space stream generator means in the Fig. 1 embodiment include the cathode 9 and the electrodes 10 through 15, the electrode 15 being the element from which electrons are directed toward the collector element 16. The electron generator means in the Fig. 5 embodiment include heater 42, cathode 41, grid 40 and secondary emission electrode 39, the latter being the element from which electrons are directed toward the collector element 38.

A number of embodiments of the present invention have now been shown and described. Each of these embodiments operates substantially logarithmically on a varying current or voltage and in particular transforms a substantially exponential variation into a substantially linear variation. These devices have many applications which will be apparent to those skilled in the art a few of which have been suggested. While the application to facsimile recording and reproducing has been mentioned, many other applications will be evident to those skilled in the art.

What is claimed is:

1. The combination of a photo-electric cathode for liberating an electron stream in response to light variations impinging thereon, a plurality of secondary emission anodes for receiving said stream and emitting augmented streams, a final collector anode connected to the last of said secondary emission anodes by means of a substantially bias-free load circuit for producing a retarding field and for receiving the secondary electrons from said last of said anodes in quantity determined in part by the velocity distribution of said last emission and in part by said retarding field, said load circuit generating an output voltage logarithmically related to said light variations over at least a predetermined range of light variations.

2. The combination of a modulated light source, a multiplier type photo-electric cell for generating and amplifying an electron stream having an instantaneous magnitude proportional to the instantaneous magnitude of said modulated light, a final anode, a next to final anode in said multiplier cell, a substantially bias-free circuit including an impedance connected between said anodes for maintaining said final anode at the same potential as said next to final anode less a voltage equal to the product of said impedance and a current flowing between said anodes whereby said voltage is logarithmically related to the instantaneous magnitude of said light.

3. Apparatus for producing an electrical output whose amplitude is related logarithmically to the amplitude of an input stimulus comprising a tube having an electron collector element, electron space stream generator means in the tube receptive to said input stimulus and including an element from which the electrons are directed toward said collector element in quantities substantially proportional to said input stimulus, and an impedance connected at one end to said collector element and at the other end to said element in the electron stream generator means, the resulting current flowing through said impedance setting up a retarding electrostatic field in the vicinity of the collector element so that the output voltage across said impedance varies substantially logarithmically with the input stimulus.

4. Apparatus for producing an electrical output whose amplitude is related logarithmically to the amplitude of an input stimulus comprising a tube having an electron collector element, electron space stream generator means in the tube receptive to said input stimulus, said means including an electron-emissive cathode and an secondary emission electrode from which electrons are directed toward said collector element in quantities substantially proportional to said input stimulus, and an unbiased impedance connected at one end to said collector element and at the other end to said secondary emission electrode, the resulting current flowing through said impedance setting up a retarding electrostatic field in the vicinity of the collector element so that the output voltage across said impedance varies substantially logarithmically with the input stimulus.

5. In a device for generating a logarithmic output, the combination of, a tube comprising at least means for generating an electron stream modulated in accordance with an input stimulus, a collector anode, and a deflecting anode for receiving said electron stream and directing it toward said collector anode, and an load impedance connected between said anodes for setting up a retarding field in the vicinity of said collector in response to current from said electron stream flowing therethrough and to develop an output voltage logarithmically related to said input stimulus.

6. In a device for generating a logarithmic output, the combination of, a tube including at least means for generating an electron stream modulated in accordance with an input stimulus, a collector anode, and a secondary emission anode for receiving said electron stream and directing an augmented stream toward said collector anode, and a load impedance connected between said anodes for setting up a retarding field in the vicinity of said collector in response to current from said augmented electron stream flowing therethrough and to develop an output voltage thereacross which is logarithmically related to said input stimulus.

7. Apparatus for producing an electrical output which is logarithmically related to an input stimulus comprising in combination, a tube having a cathode and a plurality of secondary emission electrodes, means for biasing said secondary emission electrodes with successively higher voltages, a collector element in the tube receptive to electrons from the last of said secondary emission electrodes, and a load impedance connected between said last secondary emission electrode and said collector element, whereby the voltage on said collector element and the current through said impedance are such as to provide an output voltage across said impedance which varies substantially logarithmically with the input stimulus.

8. Apparatus for producing an electrical output which is logarithmically related to an input stimulus, comprising in combination, a tube having an electron collector element and electron space stream generator means responsive to said input stimulus and including a secondary emission electrode from which electrons are directed toward said collector element in quantities substantially proportional to said input stimulus, and an impedance connected between said collector element and said secondary emission electrode, said impedance acting to bias the collector element in such a manner that the voltage across the impedance varies logarithmically with the input stimulus.

9. Apparatus for producing an electrical output which is logarithmically related to an input stimulus, comprising in combination, a tube having an electron collector element and electron space stream generator means responsive to said input stimulus and including a secondary emission electrode from which electrons are directed toward said collector element in quantities substantially proportional to said input stimulus, and a load impedance connected between said secondary emission electrode and said collector element for biasing the collector element at a lower potential than the secondary emission electrode so that the output voltage across said load impedance varies substantially logarithmically with the input stimulus.

10. Apparatus for producing an electrical output which is logarithmically related to an input stimulus, comprising in combination, a tube having an electron collector element and electron space stream generator means receptive to said input stimulus and including an electrode from which electrons are directed toward said collector element in quantities substantially proportional to said input stimulus, and an output impedance connected between said electrode and said collector element to bias the collector element at a varying lower potential than the electrode so that the voltage across said output impedance varies substantially logarithmically with the input stimulus.

11. A phototube circuit for generating an electrical output which varies logarithmically with light flux received and thus varies directly with the optical density of a sample, comprising in combination, a multiplier-type phototube having a photocathode, a plurality of dynodes and a collector element, means for biasing said dynodes with progressively higher accelerating voltages, and an impedance connected between said collector element and the last of said dynodes, said impedance acting to bias the collector element at a varying lower potential than the last dynode so that the voltage across the impedance varies substantially logarithmically with the received light flux.

FRANK A. HESTER.

REFERENCES CITED

The following references are of record in the file of this patent:

UNITED STATES PATENTS

| Number | Name | Date |
|---|---|---|
| 2,202,629 | Hansell | May 28, 1940 |
| 2,239,362 | Gilbert | Apr. 22, 1941 |
| 2,269,001 | Blumlein | Jan. 6, 1942 |
| 2,272,841 | Henneberg | Feb. 10, 1942 |
| 2,290,775 | Snyder, Jr. | July 21, 1942 |
| 2,311,981 | Farnsworth | Feb. 23, 1943 |
| 2,316,044 | Blair | Apr. 6, 1943 |
| 2,392,416 | Sorensen | Jan. 8, 1946 |
| 2,408,261 | La Katos | Sept. 24, 1946 |
| 2,478,163 | Sweet | Aug. 2, 1949 |

FOREIGN PATENTS

| Number | Country | Date |
|---|---|---|
| 111,275 | Australia | Aug. 29, 1940 |